UNITED STATES PATENT OFFICE.

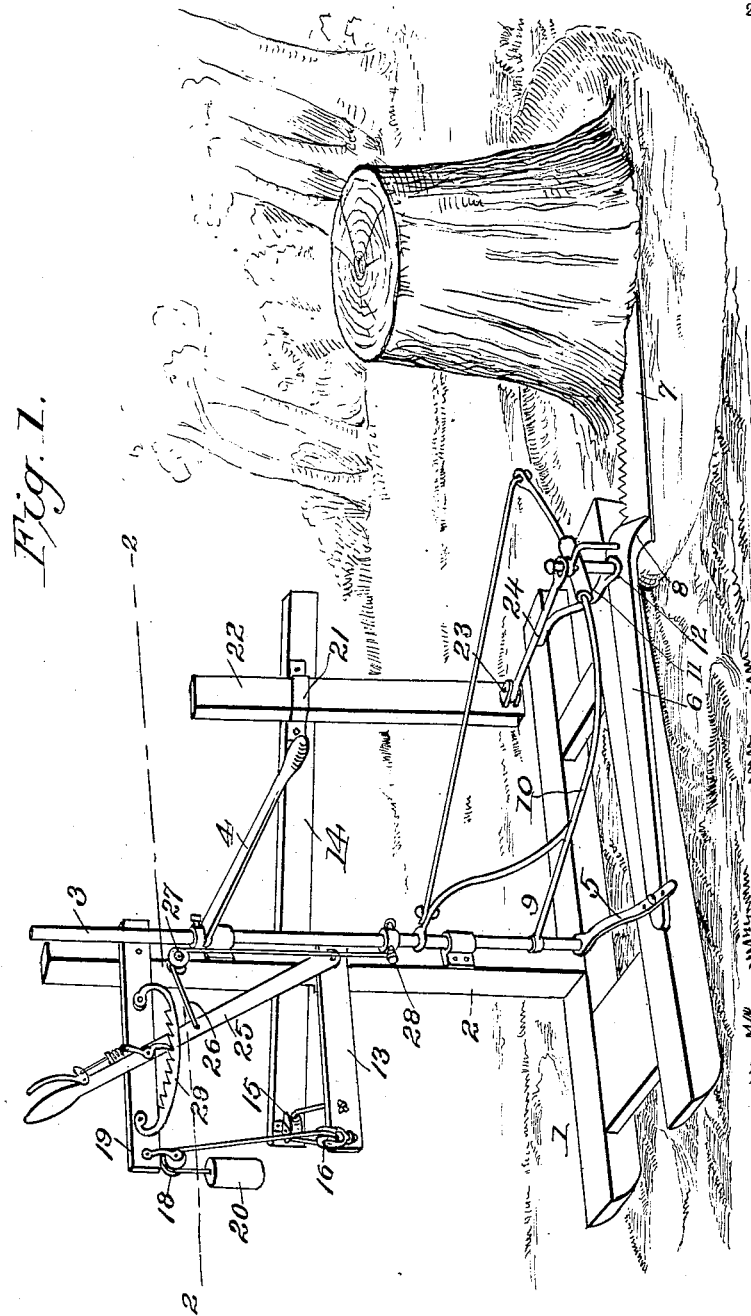

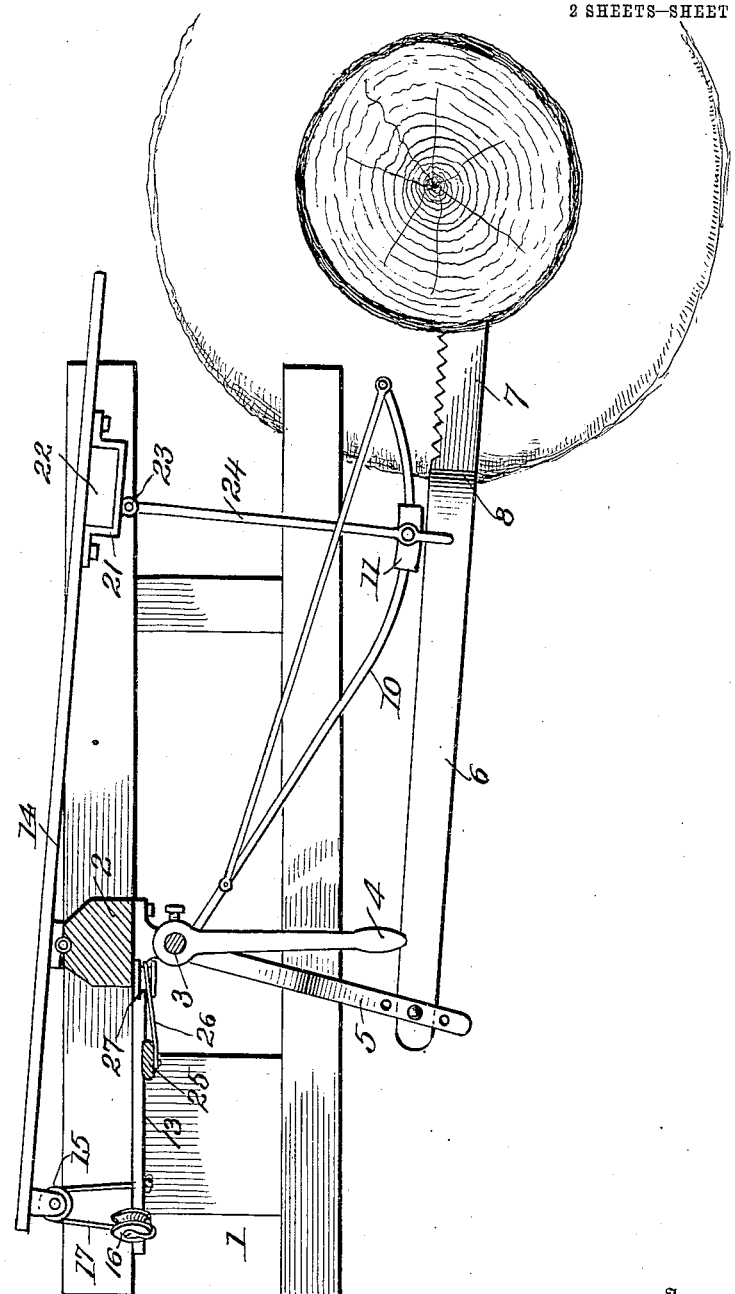

CHARLES C. WOOD, OF CULDESAC, IDAHO, ASSIGNOR OF ONE-HALF TO MAY SELLERS MEIER, OF CULDESAC, IDAHO.

SAW.

1,042,633.  Specification of Letters Patent.  Patented Oct. 29, 1912.

Application filed May 19, 1911. Serial No. 628,301.

*To all whom it may concern:*

Be it known that I, CHARLES C. WOOD, a citizen of the United States, residing at Culdesac, in the county of Nez Perce and State of Idaho, have invented certain new and useful Improvements in Saws, of which the following is a specification.

This invention relates to sawing machines and aims primarily to provide a sawing machine which may be employed for the purpose of cutting down stumps below the surface of the ground.

One aim of the invention is to so construct the machine and to mount the saw-blade thereof that the said blade may be adjusted to cut down a stump at the desired distance below the surface of the ground and will be automatically fed through the stump while being reciprocated.

For a full understanding of the invention reference is to be had to the following description and accompanying drawing, in which:—

Figure 1 is a perspective view of the saw. Fig. 2 is a top plan view thereof.

Corresponding and like parts are referred to in the following description and indicated in all the views of the accompanying drawing by the same reference characters.

In the drawing, the sawing machine embodying the present invention is illustrated as mounted on runners 1 although it may be equally as well mounted upon a wheeled frame and includes an upright 2 upon which is journaled a rock-shaft 3. A hand-lever 4 projects laterally from the rock-shaft 3 and serves as a means whereby the shaft may be rocked. An arm 5 also projects laterally from the shaft 2, at its lower end, and to the outer end of this arm is pivoted the rear end of the shank 6 of the saw-blade of the machine, indicated by the numeral 7. Adjacent to its point of attachment to the saw-blade 7, the shank 6 is bent downwardly as at 8 so that when the saw blade is reciprocating in a shallow excavation, the shank 6 will lie above the ground. A support including arms 9, which are fixed upon the shaft 3 for swinging movement therewith, and an arcuate portion 10 which extends from the arms, supports upon its said portion 10, a slide 11. This slide is substantially T-shaped and has its head fitted upon the portion 10 of the swinging support and its stem projecting downwardly and pivoted as at 12 to the shank of the saw-blade near the off-set portion 8 thereof. At this point it will be readily understood that as the hand-lever 14 is swung backwardly and forwardly by the operator of the machine, the arm 5 will have similar movement imparted to it and the saw-blade will be reciprocated. As the blade reciprocates the slide 11 will move back and forth along the portion 10 of the support and the blade will consequently be held against dropping.

A fixed bracket arm 13 projects rearwardly from the upright 2 and an arm 14 is mounted to swing upon the said upright and carries at one end a pulley 15. The bracket arm 13 carries a similar pulley 16 and a cable or other suitable flexible connection 17 is attached at one end to the bracket arm 13, and trained about the pulley 15 and 16 in the order mentioned, and over a pulley 18 which is mounted at the outer end of a second bracket arm 19 secured upon the upright 2 near the upper end thereof. A weight 20 is attached at the other end of the cable 17 and this weight serves to exert a constant pull upon the cable tending to swing the pulley-carrying end of the arm 14 toward the bracket arm 13 and to swing the opposite end of the arm 14 in a direction away from the saw-blade.

Mounted for vertical adjustment in a bracket 21 upon the arm 14 near its last mentioned end is a bar 22 and pivoted to this bar at its lower end, as at 23, is a rod 24 having its opposite end branched and pivoted to the upper and lower ends of the pivot bolt 12 for the slide 11. At this point it will be readily understood that as the saw-blade is reciprocated, it will be fed to the left, through the stump being cut down, due to the fact that the arm 14 has a tendency to swing as above described.

In order that the shaft may be adjusted vertically whereby to raise or lower the saw-blade, there is provided a manually operable lever 25 which is pivoted at its lower end to the bracket arm 13 at the inner end thereof and has connected to it a cable or other suitable flexible connection 26 which is trained over a pulley 27 upon the upright 2 and is connected at its other end to a collar 28 fixed upon the shaft 3. This lever 25 coöperates with a rack 29 by which it is held at proper adjustment.

From the foregoing it will be readily understood that prior to operating the hand-lever 4 the lever 25 is adjusted to properly position the saw-blade 7 in an excavation which has been made around the stump to be cut down, and after this has been done, the said lever 4 is swung backwardly and forwardly by the operator of the machine, unless the shaft 3 is to be operated by a motor or other power. As the saw reciprocates, it will be fed automatically through the stump by the lateral pull exerted upon it through the medium of the arm 14 and the connections between this arm and the shank of the saw.

Having thus described the invention what is claimed as new is:—

1. In a sawing machine, a support, a rock-shaft mounted for vertical adjustment upon the support, means operable to rock the shaft, an arm projecting from the shaft, a swinging support, a saw-blade having a shank pivoted to the arm, and a slide mounted upon the support and supporting the blade-shank.

2. In a sawing machine, a rock-shaft, means operable to rock the shaft, an arm projecting from the shaft, a swinging support supported by the rock-shaft, a saw-blade having a shank pivoted to the arm, a slide mounted upon the support and supporting the blade-shank, and a lever operable to vertically adjust the shaft.

3. In a sawing machine, a rock-shaft, means operable to rock the shaft, an arm projecting from the shaft, a swinging support, a saw-blade having a shank pivoted to the arm, a slide mounted upon the support and supporting the blade shank, a manually operable lever, a support for the lever, a pulley upon the support, and flexible connection between the lever and rock-shaft trained over the said pulley.

4. In a sawing machine, a support, a rock-shaft mounted thereon, means operable to rock the shaft, an arm projecting from the shaft, a swinging support mounted upon the shaft, the shaft and the support thereon being vertically adjustable, a saw-blade having a shank pivoted to the arm, and a slide mounted upon the support and supporting the blade-shank.

5. In a sawing machine, a support, a rock-shaft mounted for vertical adjustment upon the support, means operable to rock the shaft, an arm projecting from the shaft, a saw-blade having a shank pivoted to the arm, an arm mounted for swinging movement, a bar supported by the arm, and connection between the lower end of the bar and the shank of the saw-blade, the shank and the bar being vertically adjustable.

6. In a sawing machine, a support, a rock-shaft mounted thereon, means for rocking the shaft, an arm projecting from the shaft, a saw-blade having a shank pivoted to the arm, means for supporting the blade for reciprocatory movement, said means comprising a support fixed upon the shaft, and a slide carried by the blade shank and working upon the support, an arm mounted for swinging movement upon the first mentioned support, means normally tending to swing the arm in one direction, means for vertically adjusting the rock-shaft, a bar supported for vertical adjustment upon the last mentioned arm, and connection between the said bar and the said slide.

In testimony whereof, I affix my signature in presence of two witnesses.

CHARLES C. WOOD. [L. S.]

Witnesses:
BERTHA UPDEGRAFF,
C. B. UPDEGRAFF.

Copies of this patent may be obtained for five cents each, by addressing the "Commissioner of Patents, Washington, D. C."